United States Patent
Rasmussen (10) Patent No.: US 9,236,047 B2
(45) Date of Patent: Jan. 12, 2016

(54) VOICE STREAM AUGMENTED NOTE TAKING

(75) Inventor: David John Rasmussen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 189 days.

(21) Appl. No.: 12/785,353

(22) Filed: May 21, 2010

(65) Prior Publication Data

US 2011/0288863 A1 Nov. 24, 2011

(51) Int. Cl.
*G10L 15/00* (2013.01)
*G10L 15/26* (2006.01)
*G10L 15/04* (2013.01)
*G06F 17/27* (2006.01)

(52) U.S. Cl.
CPC ............ *G10L 15/04* (2013.01); *G06F 17/2775* (2013.01); *G10L 15/26* (2013.01)

(58) Field of Classification Search
USPC .......................... 704/231, 235, 251, 270, 275
See application file for complete search history.

(56) References Cited

U.S. PATENT DOCUMENTS

| | | | |
|---|---|---|---|
| 6,377,965 B1 * | 4/2002 | Hachamovitch et al. | 715/203 |
| 7,089,188 B2 | 8/2006 | Logan et al. | |
| 7,117,442 B1 | 10/2006 | Kemble et al. | |
| 7,149,970 B1 * | 12/2006 | Pratley et al. | 715/257 |
| 2002/0035616 A1 * | 3/2002 | Diamond et al. | 709/219 |
| 2002/0107896 A1 * | 8/2002 | Ronai | 707/530 |
| 2003/0187649 A1 | 10/2003 | Logan et al. | |
| 2004/0153969 A1 * | 8/2004 | Rhodes | 715/515 |
| 2007/0116199 A1 * | 5/2007 | Arrasvuori et al. | 379/68 |
| 2008/0040111 A1 | 2/2008 | Miyamoto et al. | |
| 2008/0313572 A1 | 12/2008 | Waldman et al. | |
| 2009/0083028 A1 * | 3/2009 | Davtchev et al. | 704/9 |
| 2009/0204620 A1 * | 8/2009 | Thione et al. | 707/10 |
| 2010/0063815 A1 * | 3/2010 | Cloran et al. | 704/235 |
| 2011/0099006 A1 * | 4/2011 | Sundararaman et al. | 704/208 |

FOREIGN PATENT DOCUMENTS

| | | |
|---|---|---|
| CN | 101013421 A | 8/2007 |
| CN | 101188110 A | 5/2008 |
| JP | 2006-178087 | 7/2006 |
| JP | 2010-044171 | 2/2010 |
| KR | 2002-0048612 | 6/2002 |
| RU | 2381570 C2 | 2/2010 |

(Continued)

OTHER PUBLICATIONS

Luz et al. "Interface Design Strategies for Computer-Assisted Speech Transcription". OZCHI 2008 Proceedings, Dec. 8-12, Cairns, QLD, Australia.*

(Continued)

*Primary Examiner* — Jesse Pullias
(74) *Attorney, Agent, or Firm* — Jessica Meyers; Tom Wong; Micky Minhas (57) ABSTRACT

Voice stream augmented note taking may be provided. An audio stream associated with at least one speaker may be recorded and converted into text chunks. A text entry may be received from a user, such as in an electronic document. The text entry may be compared to the text chunks to identify matches, and the matching text chunks may be displayed to the user for selection.

20 Claims, 4 Drawing Sheets

(56) References Cited

FOREIGN PATENT DOCUMENTS

TW          I304538 B     12/2008
WO       2007118100 A2    10/2007

OTHER PUBLICATIONS

International Search Report for Application No. PCT/US2011/034665 mailed Dec. 23, 2011, 4 pages.

European Search Report for Application No. 11783936.5 mailed Oct. 9, 2013.

"First Office Action and Search Report Received for Chinese Application No. 201180025007.3", Mailed Date: Sep. 2, 2014, 16 Pages.

"Second Office Action Issued in Chinese Patent Application No. 201180025007.3", Mailed Date: Apr. 24, 2015, 10 Pages.

"Office Action and Search Report Issued in Taiwan Patent Application No. 100112854", Mailed Date: Aug. 12, 2015, 7 Pages.

"Notice of Allowance Issued in Russian Patent Application No. 2012149444", Mailed Date: Aug. 18, 2015, 9 Pages. (W/o English Translation).

"Third Office Action Issued in Chinese Patent Application No. 201180025007.3", Mailed Date: Oct. 27, 2015, 10 Pages.

\* cited by examiner

VOICE STREAM AUGMENTED NOTE TAKING

BACKGROUND

Voice stream augmented note taking is a process for capturing information from an audio recording and associating that information with user-generated content. In some situations, it can be helpful for a user to be provided with additional information when the user is reviewing notes taken. For example, a user may be typing notes during a presentation such as a lecture or a meeting, but may not remember additional details associated with those notes during a later review. Attempts by the note taker to include all those details while listening to the presentation may result in the note taker missing later details as they try to keep up. Conventional systems, such as short hand, stenography, and rapid typing are often difficult to learn and may be impractical for casual conversations.

SUMMARY

Voice stream augmented note taking may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Voice stream augmented note taking may be provided. An audio stream associated with at least one speaker may be recorded and converted into text chunks. A text entry may be received from a user, such as in an electronic document. The text entry may be compared to the text chunks to identify matches, and the matching text chunks may be displayed to the user for selection.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, a voice stream around a note taker may be recorded. The voice(s) may be recognized, such as through a text to speech algorithm, and broken down into sentences and/or phrases to provide a buffer of recent text chunks. As the note taker types notes, their typed text may be matched against recent sentences and phrase chunks from the voice stream. Autocomplete suggestions may be offered to the note taker. These suggestions may be selected and added to the typed notes based on small amounts of text entered by the note taker.

As a user is typing notes, such as on a laptop or tablet computer, a microphone in the computer may be recording all that is said in the area. The computer may convert the incoming speech into a text stream based on speech recognition matches. Speech recognition algorithms, such as those based on Hidden Markov Models (HMM) are known in the art as statistical models that output a sequence of symbols or quantities. In speech recognition, the HMM may output a sequence of n-dimensional real-valued vectors (with n being a small integer, such as 10), on a regular basis, such as every 10 milliseconds. The vectors may comprise cepstral coefficients, which may be obtained by taking a Fourier transform of a short time window of speech, decorrelating the spectrum using a cosine transform, and then taking the first (most significant) coefficients. The HMM may have a statistical distribution that is a mixture of diagonal covariance Gaussians which may give a likelihood for each observed vector. Each word, or (for more general speech recognition systems), each phoneme, may have a different output distribution. A Hidden Markov Model for a sequence of words or phonemes may be made by concatenating the individual trained HMM for the separate words and phonemes.

Speech recognition systems may use various combinations of a number of standard techniques in order to improve results over the basic approach described above. A typical large-vocabulary system may need context dependency for the phonemes (so phonemes with different left and right context have different realizations as HMM states). A speech recognizer may use cepstral normalization to normalize for different speaker and recording conditions and/or it may use vocal tract length normalization (VTLN) for male-female normalization and maximum likelihood linear regression (MLLR) for more general speaker adaptation.

As the speech is recognized and converted into text, each word and/or phrase may be assigned a weighted probability, such as by evaluating context and/or grammatical rules. As more speech is converted, the probabilities may be adjusted based on later identified words and/or phrases. Additionally a user's own notes may be used to assign and/or modify the probabilities. For example, the voice stream may be converted into a text stream comprising the phrase "four times eight is thirty-two". The conversion may assign a higher probability that the first word is "four" rather than "for" based on the context of other numbers in the phrase, or a user may, in close temporal proximity, enter the text "four times".

The recorded voice stream and/or the converted text stream may be stored in a buffer for a configurable amount of time. For example, the buffer may keep the preceding minute of recording before discarding the voice stream and/or text stream. This time may be increased or decreased based on the user's preferences and/or the device's capabilities, for example. Furthermore, the text in the buffer may be broken into chunks based on pauses, sentence breaks, phrase breaks, and/or conjunction words. For example, transition words like "moving on", "the next point", "otherwise", etc., may comprise entries in a list of phrase boundaries that may be used to divide the text.

As the user inputs text, the chunks may be searched for possible matches that may be displayed to the user. For example, the text buffer may comprise the words "Audio recording is easy, but audio searching is hard." If the user then types the letters "a-u-d", the phrases "audio recording is easy" and "audio searching is hard" may be identified as potentially matching chunks. These chunks may be displayed for selection, such as in a pop-up list, and the user may select one via known interactions such as mouse-clicking the chosen chunk, pressing a key such as space or tab to select a displayed chunk, tapping one with a stylus, etc. The chunks may be displayed according to a timestamp associated with each phrase and/or word, such as ordering them in chronological (oldest first) or reverse chronological (newest first) order.

The chunks may also be ordered by relevance. For example, the text stream may comprise the chunks "forewarned is forearmed" and "try for a high score". If the user types "f-o-r", relevance ordering may result in the "forewarned is forearmed" phrase being ordered first in the list based on the typed letters being part of a longer word, appearing more often in the chunk, or being associated with a more important word (as where prepositions such as "for" are given lower importance).

Figure 1:
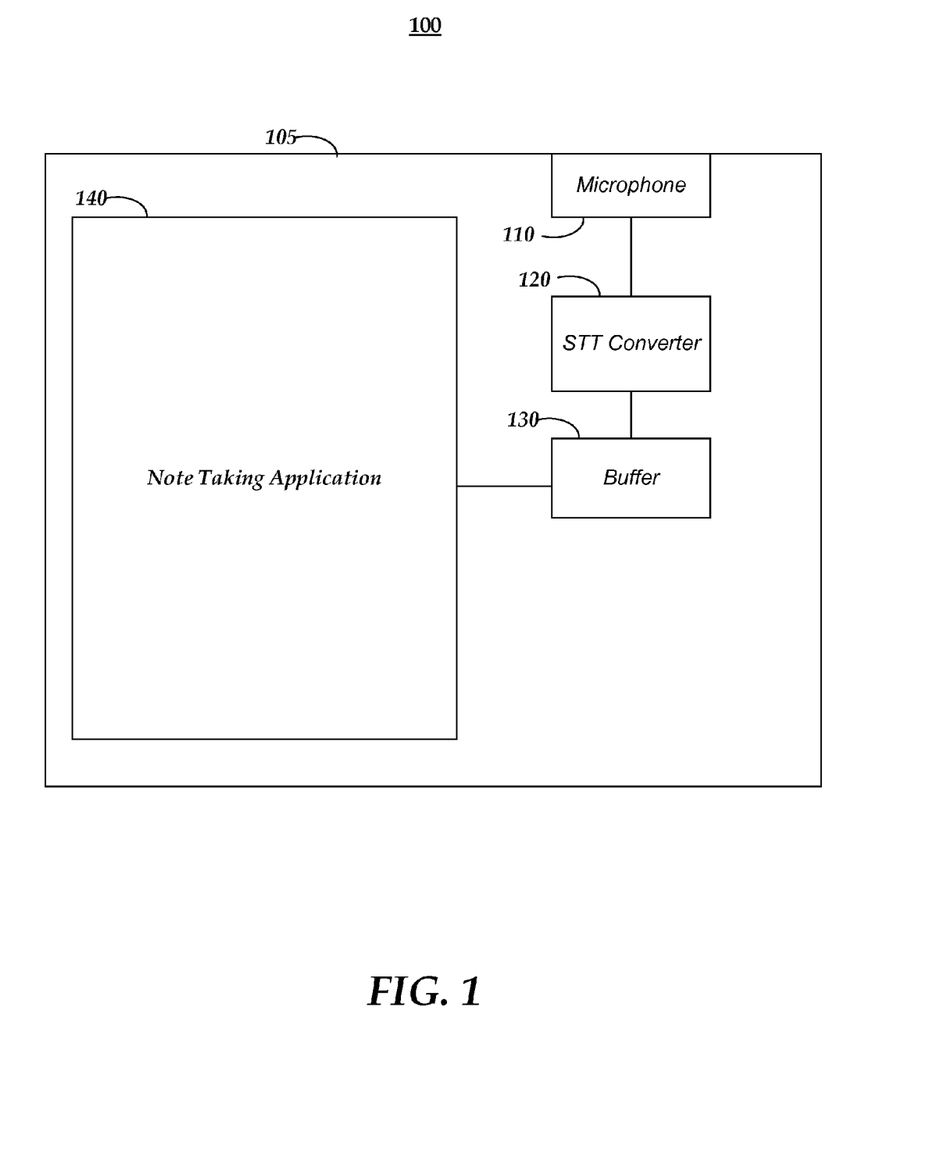
FIG. 1 is a block diagram of an operating environment.

FIG. 1 is a block diagram of an operating environment 100 for providing voice print identification. Operating environment 100 may comprise a user device 105 comprising a microphone 110 coupled to a speech to text (STT) converter 120. STT converter 120 may be coupled to a memory buffer 130 operative to store converted text. User device 105 may further comprise a note taking application 140, such as a word processing application that may be communicatively coupled to STT converter 120 and/or buffer 130. Note taking application 140 may be operative to create, open, edit, and/or save electronic documents as files.

Figure 2:
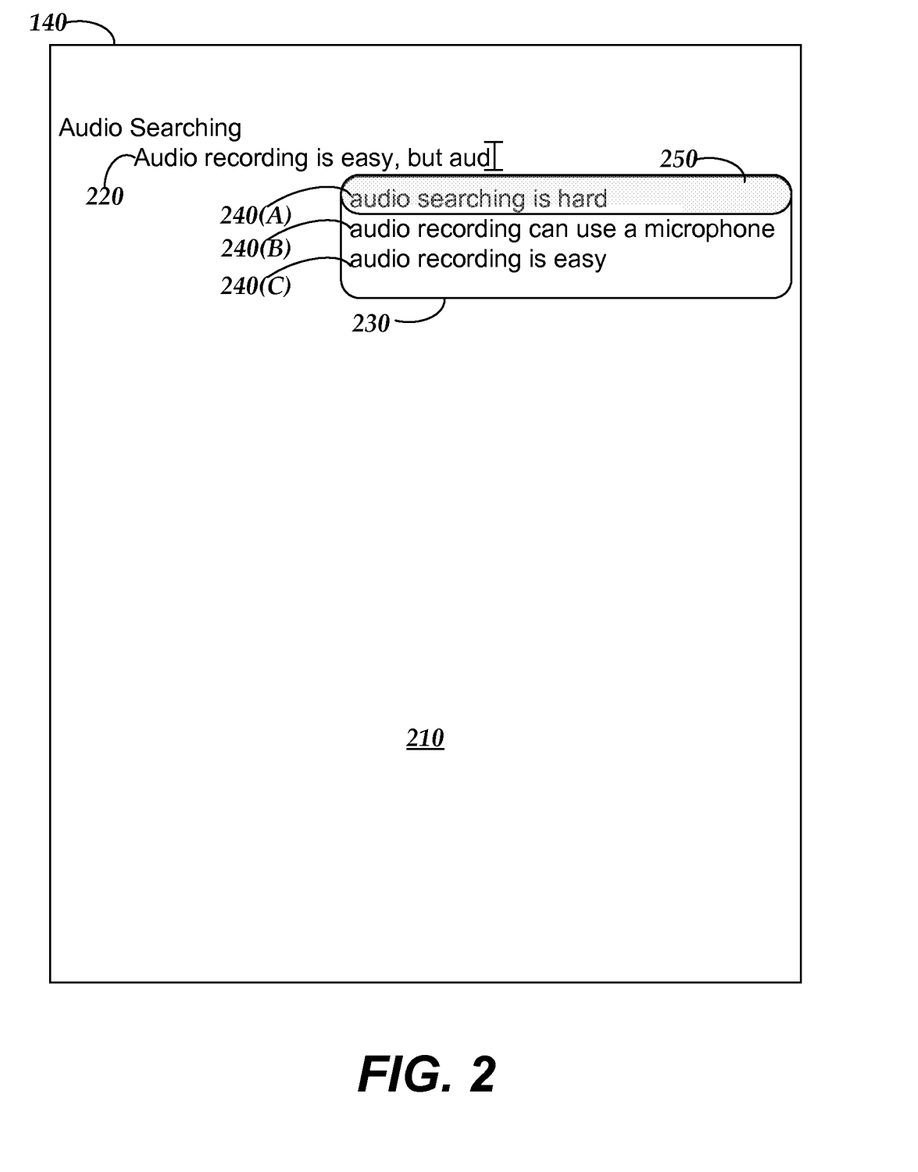
FIG. 2 is a block diagram of a note taking application.

FIG. 2 illustrates note taking application 140 in greater detail. Note taking application 140 may comprise a user interface area 210 operative to receive a user text input 220. In response to receiving user text input 220, note taking application 140 may determine whether any text segments converted from recorded speech and stored in buffer 130 match text in user text input 220. Consistent with embodiments of the invention, the matching may comprise, for example phonetic (e.g., "for" matches "four") and/or character by character matching. Note taking application 140 may display matching text segments, for example, in a tooltip element 230 comprising a plurality of matching text segments 240(A)-(C). The most relevant match, such as the text segment following the most recently entered text, may comprise a selection of matching text segments 240(A)-(C) identification 250, such as highlighting. The selection identification may be moved by the user, such as by using the arrow keys, and the highlighted one of matching text segments 240(A)-(C) may be selected for insertion into user interface area 210, such as by the user pressing the enter and/or tab keys on their keyboard or selecting an option via a mouse and/or stylus.

Figure 3:
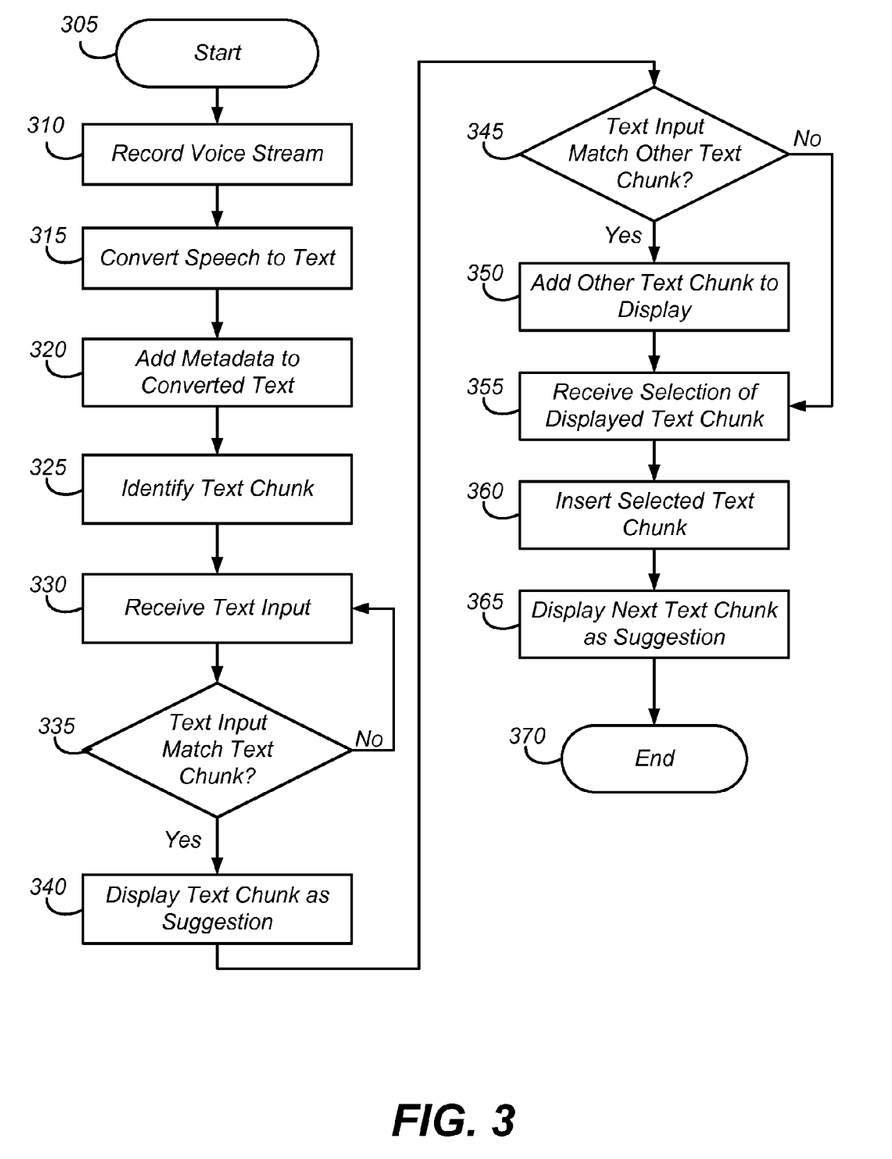
FIG. 3 is a flow chart of a method for providing voice print identification.

FIG. 3 is a flow chart setting forth the general stages involved in a method 300 consistent with an embodiment of the invention for providing voice print identification. Method 300 may be implemented using computing device 400 as described in more detail below with respect to FIG. 4. Ways to implement the stages of method 300 will be described in greater detail below. Method 300 may begin at starting block 305 and proceed to stage 310 where computing device 400 may record a speech stream into a buffer. For example, user device 105 may record a voice/speech stream via microphone 110.

From stage 310, method 300 may advance to stage 315 where computing device 400 may convert the recorded speech stream to a text stream. For example, STT converter 120 may execute a Hidden Markov Model algorithm to convert the recorded voice to characters and words. Consistent with embodiments of the invention, STT converter 120 may identify and insert punctuation according to programmatic and/or grammar rules. For example, the text stream may have periods inserted during pauses and/or may have commas inserted before conjunctions.

From stage 315, method 300 may advance to stage 320 where computing device 400 may add metadata to the converted text stream. For example, user device 105 may add a timestamp to each word, phrase, and/or sentence in the text stream. Metadata may also include data to aid in matching the converted text to textual inputs from the user, such as common abbreviations, misspellings, and/or phonetic alternates.

From stage 320, method 300 may advance to stage 325 where computing device 400 may identify at least one text chunk within the converted text stream. STT converter 120 and/or note taking application 140 may identify logical breaks between words such as by identifying enumerations, prepositions, and/or conjunctions in the text stream and/or pauses that may identify phrase and/or sentence boundaries. For example, the text stream may comprise enumerations such as "the first point," "the second item," "the next topic," "the last thing," etc. These enumerations may be used to identify phrase and/or sentence boundaries. Consistent with embodiments of the invention, such introductory phrases and/or conjunctions may categorized as less relevant to the note taking than the content-laden text chunks they surround. These less relevant portions of the text stream may be broken off into their own chunks so as to eliminate unnecessary words from the suggestions presented to the user as described below.

From stage 325, method 300 may advance to stage 330 where computing device 400 may receive a text input. For example, a user of user device 105 may enter at least one character and/or words into note taking application 140.

From stage 330, method 300 may advance to stage 335 where computing device 400 may determine whether the text input matches any of the converted text stream. For example, the text stream may comprise "We should set up a meeting for next Tuesday. How does two o'clock work?" The stream may be broken into two (and/or more) chunks, such as "set up a meeting for next Tuesday" and "how does two o'clock work." If the user types the letters "m-e-e-t", computing device 400 may identify the "set up a meeting for next Tuesday" as a matching text chunk. If no text chunk matches at least a portion of the converted text stream, method 300 may return to stage 330 and continue to receive text inputs.

Otherwise, method 300 may advance to stage 340 where computing device 400 may display the matching text chunk as a suggestion. For example, note taking application 140 may display the matching text chunk in tooltip element 230. The display may be proximate to a current text entry point within an electronic document displayed in note taking application 140.

From stage 340, method 300 may advance to stage 345 where computing device 400 may determine whether the text input at least partially matched at least one second identified text chunk. For example, note taking application 140 may scan buffer 130 for any text chunks that match the text input.

If additional text chunks match, method 300 may advance to stage 350 where computing device 400 may display the at least one second text chunk as a second suggested text chunk to the user of the system. For example, note taking application 140 may display plurality of text chunks 240(A)-(C) in an order associated with a weighting probability associated with the likely relevance of the text chunk to the matching text input. The matching text chunks may be assigned a weighted relevance probability, such as by temporal proximity to the text input, by content, and/or by context. Some examples of weighting relevance may comprise a matching word that was spoken ten seconds ago being weighted more relevant than the same word spoken 30 seconds ago and/or a matching word in a prepositional phrase being weighted less relevant than the same word outside of such a phrase.

From stage 350, or if no additional matching text chunks are identified at stage 345, method 300 may advance to stage 355 where computing device 400 may receive a selection of one of the displayed text chunks. For example, one of text chunks 240(A)-(C) may be clicked on by a user via a mouse and/or stylus.

From stage 355, method 300 may advance to stage 360 where computing device 400 may insert the selected text chunk into the electronic document within note taking application 140. For example, if the user has entered the letters "m-e-e-t" and selected the text chunk "Meeting with Sandy on Tuesday", the words "Meeting with Sandy on Tuesday" may be inserted in place of the entered letters "m-e-e-t". Consistent with embodiments of the invention, metadata assigned to each text chunk may be used to provide additional information, such as by associating "Sandy" with a contact in the user's address book and/or adding a date for the next Tuesday according to the user's calendar.

From stage 360, method 300 may advance to stage 365 where computing device 400 may display a sequentially later text chunk to the selected text chunk. For example, after inserting the selected text chunk, note taking application 140 may use timestamp metadata associated with the inserted text chunk to identify the next text chunk in sequential order and may display that text chunk as a suggestion to the user. For example, after inserting "Meeting with Sandy on Tuesday," note taking application 140 may display a subsequent phrase "about marketing efforts" as a selectable suggestion for insertion into the electronic document. This suggestion may be selected for insertion by the user, as described with respect to stage 355. Method 300 may then end at stage 370.

An embodiment consistent with the invention may comprise a system for providing voice stream augmented note taking. The system may comprise a memory storage and a processing unit coupled to the memory storage. The processing unit may be operative to record an audio stream associated with a speaker, convert the audio stream into text chunks, receive a text entry from a user, determine whether the text entry is associated with one of the text chunks, if so, display the at least one text chunk to the user as a suggestion in a selectable interface element. Converting the audio stream into text chunks may comprise being operative to perform a speech to text conversion on the audio stream and identify at least one text chunk boundary. The text chunk boundary may comprise, for example, a phrase boundary, a sentence boundary, and a time boundary and each chunk may be associated with a timestamp operative to maintain a sequence order of the text chunks. The processing unit may be further operative to receive a selection of the displayed text chunk from the user and insert the displayed at least one text chunk into an electronic document. The processing unit may also be operative to display additional text chunks, such as those text chunks subsequent to the user selected text chunk. Consistent with embodiments of the invention, the processing unit may be operative to identify a plurality of text chunks that match the text entry and display at least some of those chunks. The displayed chunks may be ordered, such as according to relevance to the user's text input or chronologically according to the time stamp associated with the converted text.

Another embodiment consistent with the invention may comprise a system for providing voice stream augmented note taking. The system may comprise a memory storage and a processing unit coupled to the memory storage. The processing unit may be operative to record a voice stream into a buffer, convert the voice stream into a text stream, identify at least one text chunk associated with the text stream, receive a text input to an electronic document from a user, and determine whether the text input at least partially matches the at least one text chunk. If the text input matches the text chunk, the processing unit may be operative to display the at least one text chunk to the user as a selectable element, receive a selection of the displayed at least one text chunk from the user, and insert the at least one text chunk into the electronic document. The processing unit may be further operative to identify a plurality of text chunks associated with the text stream such as by a pause in the recorded voice stream, a sentence boundary, a conjunction word within the text stream, and/or a phrase boundary. The processing unit may be further operative to display each of the plurality of text chunks that at least partially match the text input to the user as a list of selectable elements, receive a second text input from the user, and remove any of the displayed plurality of text chunks that do not at least partially match the second text input from the list of selectable elements. The processing unit may be operative to store a configurable time period of the recorded voice stream. For example, the previous five, ten, or fifteen minutes of converted recording may be stored. The processing unit may also be operative to determine when a particular voice stream is over, such as by identifying an extended pause or detecting that the user has deactivated an associated recording device and store the associated converted text chunks with the electronic document.

Yet another embodiment consistent with the invention may comprise a system for providing voice stream augmented note taking. The system may comprise a memory storage and a processing unit coupled to the memory storage. The processing unit may be operative to record a speech stream into a buffer, wherein the buffer comprises an amount of memory within the memory storage sufficient to store a configurable time period of the recorded speech stream, convert the recorded speech stream stored in the buffer into a corresponding text stream comprising a plurality of word, associate metadata comprising a timestamp with each of the plurality of words, identify at least one text chunk within the corresponding text stream, receive a text input into an electronic document from a user of the system, determine whether the text input at least partially matches the at least one text chunk, wherein the at least one text chunk comprises a most recently identified text chunk within the corresponding text stream, in response to determining that the text input at least partially matches the at least one text chunk, and display the at least one text chunk as a suggested text chunk to the user of the system. The processing unit may be further operative to determine whether the text input at least partially matched at least one second identified text chunk, display the at least one second text chunk as a second suggested text chunk to the user of the system, receive a selection of at least one of the at least one text chunk and the at least one second text chunk from the user of the system, insert the selected at least one of the at least one text chunk and the at least one second text chunk into the electronic document, and display at least one third text chunk as a third suggested text chunk, wherein the at least one third text chunk comprises a sequentially later text chunk from the selected at least one of the at least one text chunk and the at least one second text chunk.

Figure 4:
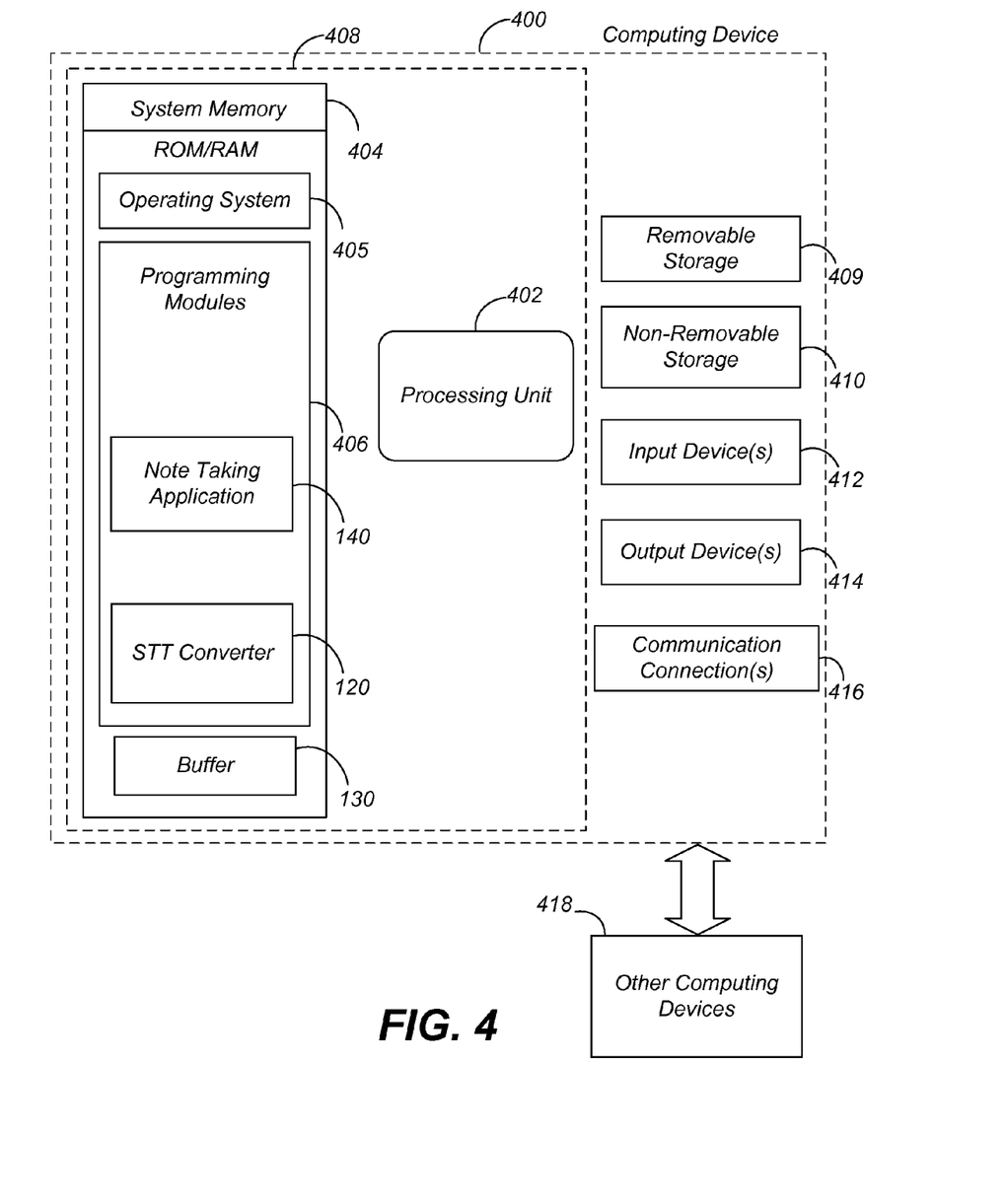
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for a system as described above. The system may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may comprise operating system 405, buffer 130, and one or more programming modules 406 comprising note taking application 140 and/or STT converter 120. Operating system 405, for example, may be suitable for controlling computing device 400's operation. In one embodiment, programming modules 406 may include voice print generator 407 that may operative to analyze recorded voices and create a voice print signature. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., note taking application 140 and/or STT converter 120) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing voice stream augmented note taking, the method comprising:
   recording an audio stream associated with at least one speaker;
   converting the audio stream into text, wherein the text includes at least one text chunk comprising a sentence or phrase, the at least one text chunk comprising content-laden text that is defined by logical breaks identifying phrase or sentence boundaries in the text;
   receiving at least one text entry from a user;
   determining whether the at least one text entry received from the user matches at least a portion of the at least one text chunk; and
   in response to determining that the at least one text entry from the user is associated with the at least one text chunk, displaying the at least one text chunk to the user as a suggestion.

2. The method of claim 1, wherein converting the audio stream into at least one text chunk comprises:
   performing a speech to text conversion on the audio stream; and
   identifying at least one text chunk boundary according to at least one of the following: a phrase boundary, a sentence boundary, and a time boundary.

3. The method of claim 1, wherein the at least one text chunk is associated with a timestamp.

4. The method of claim 3, wherein the received at least one text entry is associated with an electronic document.

5. The method of claim 4, further comprising:
   receiving a selection of the displayed at least one text chunk from the user; and
   inserting the displayed at least one text chunk into the electronic document.

6. The method of claim 5, further comprising displaying at least one second converted text chunk to the user.

7. The method of claim 6, wherein the at least one second converted text chunk comprises a next subsequent text chunk following the at least one text chunk.

8. The method of claim 1, further comprising:
   identifying a plurality of converted text chunks at least partially matching the at least one text entry; and
   displaying the plurality of converted text chunks to the user as a selectable list.

9. The method of claim 8, wherein each of the plurality of converted text chunks is associated with a time stamp.

10. The method of claim 9, wherein each of the plurality of converted text chunks are displayed in the selectable list in chronological order.

11. The method of claim 9, wherein each of the plurality of converted text chunks are displayed in the selectable list in reverse chronological order.

12. The method of claim 8, wherein each of the plurality of converted text chunks are displayed in the selectable list in order of relevance to the at least one text entry.

13. The method of claim 1, wherein displaying the at least one text chunk to the user as a suggestion includes the at least one text chunk identified in converting the audio stream into the at least one text chunk.

14. The method of claim 1, wherein the phrase or sentence boundaries in the text stream comprise logical breaks in the text stream.

15. A computer-readable storage device which stores a set of instructions which when executed performs a method for providing voice stream augmented note taking, the method executed by the set of instructions comprising:
   recording a voice stream into a buffer;
   converting the voice stream into a text stream, wherein the text stream includes at least one text chunk comprising a sentence or phrase, the at least one text chunk comprising content-laden text that is defined by logical breaks identifying phrase or sentence boundaries in the text;
   receiving a text input to an electronic document from a user;
   determining whether the text input at least partially matches the at least one text chunk;
   in response to determining that the text input at least partially matches the at least one text chunk, displaying the at least one text chunk to the user as a selectable element;
   receiving a selection of the displayed at least one text chunk from the user; and
   inserting the at least one text chunk into the electronic document.

16. The computer-readable storage device of claim 15, further comprising:
   identifying a plurality of text chunks associated with the text stream, wherein each of the plurality of text chunk is identified according to at least one boundary and wherein the at least one boundary comprises at least one of the following: a pause in the recorded voice stream, a sentence boundary, a conjunction word within the text stream, and a phrase boundary.

17. The computer-readable storage device of claim 16, further comprising displaying each of the plurality of text chunks that at least partially match the text input to the user as a list of selectable elements.

18. The computer-readable storage device of claim 17, further comprising:
   receiving a second text input from the user; and
   removing, from the list of selectable elements, any of the displayed plurality of text chunks that do not at least partially match the second text input.

19. The computer-readable storage device of claim 15, further comprising:
   in response to receiving the selection of the displayed at least one text chunk from the user, displaying at least one subsequent text chunk to the user as a selectable element.

20. A system for providing voice stream augmented note taking, the system comprising:
   a memory storage; and
   a processing unit coupled to the memory storage, wherein the processing unit is operative to:
      record a speech stream into a buffer, wherein the buffer comprises an amount of memory within the memory storage sufficient to store a configurable time period of the recorded speech stream,
      convert the recorded speech stream stored in the buffer into a corresponding text stream comprising a plurality of words,
      associate metadata comprising a timestamp with each of the plurality of words,
      identify at least one text chunk within the corresponding text stream, wherein the at least one text chunk comprises at least one of the following: a pause, a sentence boundary, a conjunction word, and a phrase boundary,
      receive a text input into an electronic document from a user of the system,
      determine whether the text input at least partially matches the at least one text chunk, wherein the at least one text chunk comprises a most recently identified text chunk within the corresponding text stream,
      in response to determining that the text input at least partially matches the at least one text chunk, display the at least one text chunk as a suggested text chunk to the user of the system,
      determine whether the text input at least partially matched at least one second identified text chunk,
      in response to determining that the text input at least partially matched at least one second identified text chunk, display the at least one second text chunk as a second suggested text chunk to the user of the system,
      receive a selection of at least one of the at least one text chunk and the at least one second text chunk from the user of the system,
      insert the selected at least one of the at least one text chunk and the at least one second text chunk into the electronic document, and
      display at least one third text chunk as a third suggested text chunk, wherein the at least one third text chunk comprises a sequentially later text chunk from the selected at least one of the at least one text chunk and the at least one second text chunk.

* * * * *